Jan. 12, 1960 T. B. HEMSLEY 2,920,720
LUBRICATORS FOR SPROCKET CHAINS
Filed Dec. 18, 1957 12 Sheets-Sheet 1

Inventor
Thomas B. Hemsley
by Albert B. Jacobs
Attorney

Jan. 12, 1960   T. B. HEMSLEY   2,920,720
LUBRICATORS FOR SPROCKET CHAINS
Filed Dec. 18, 1957   12 Sheets-Sheet 2

Inventor
Thomas B. Hemsley
by Albert Jacobs
Attorney

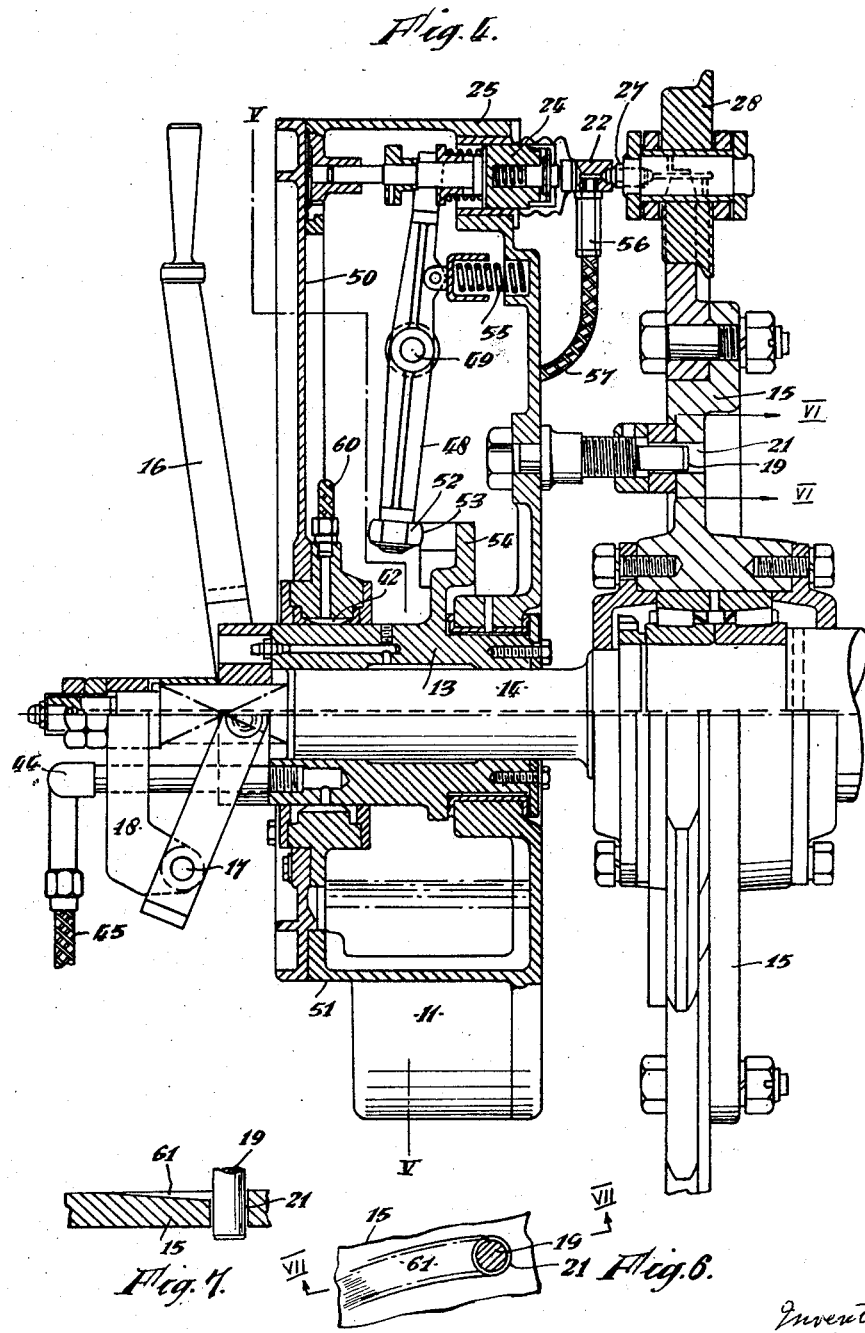

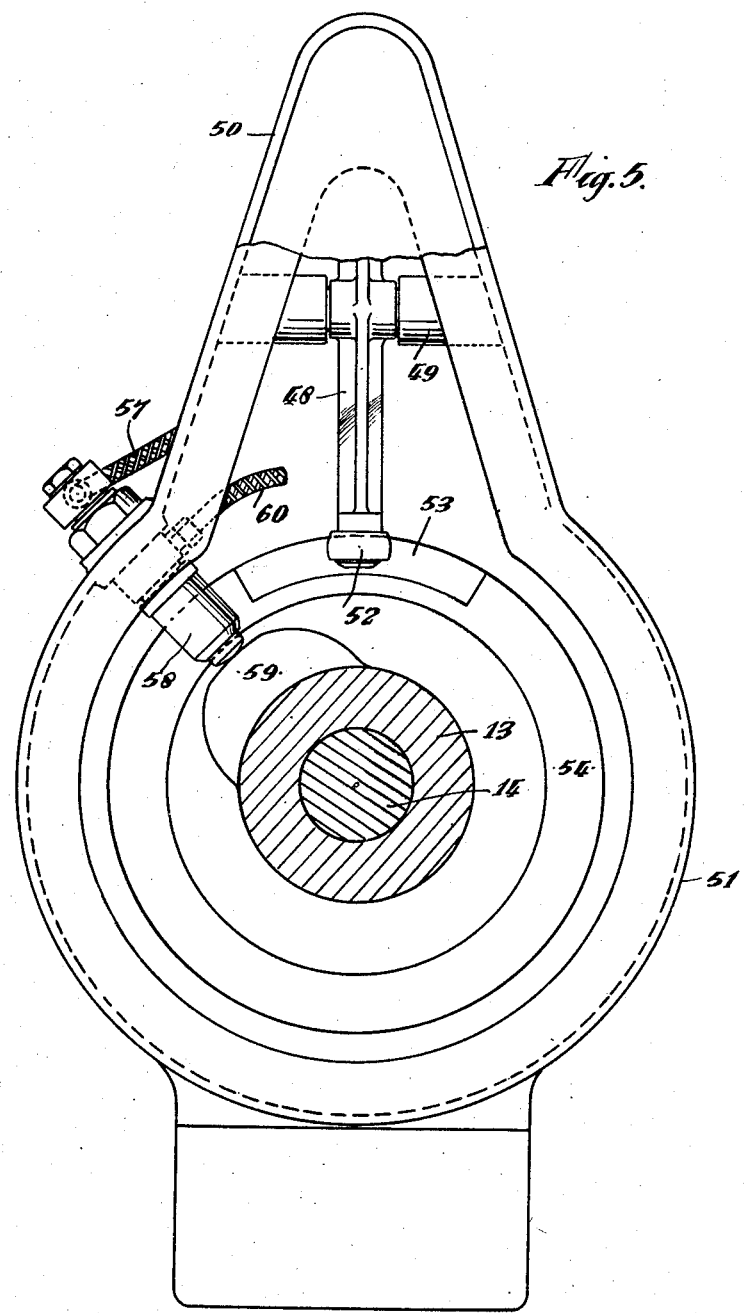

Jan. 12, 1960 T. B. HEMSLEY 2,920,720
LUBRICATORS FOR SPROCKET CHAINS
Filed Dec. 18, 1957 12 Sheets-Sheet 6

Inventor
Thomas B. Hemsley
by Albert Jacobs
Attorney

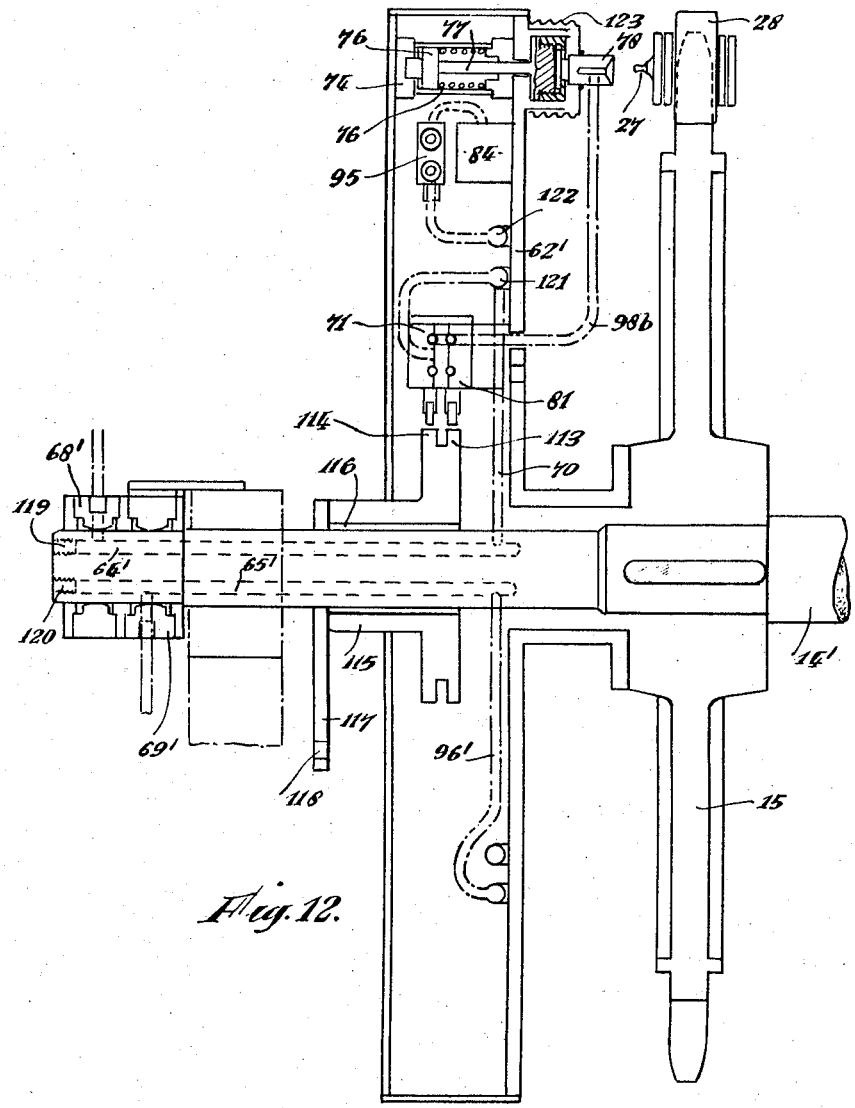

Jan. 12, 1960     T. B. HEMSLEY     2,920,720
LUBRICATORS FOR SPROCKET CHAINS
Filed Dec. 18, 1957     12 Sheets-Sheet 9
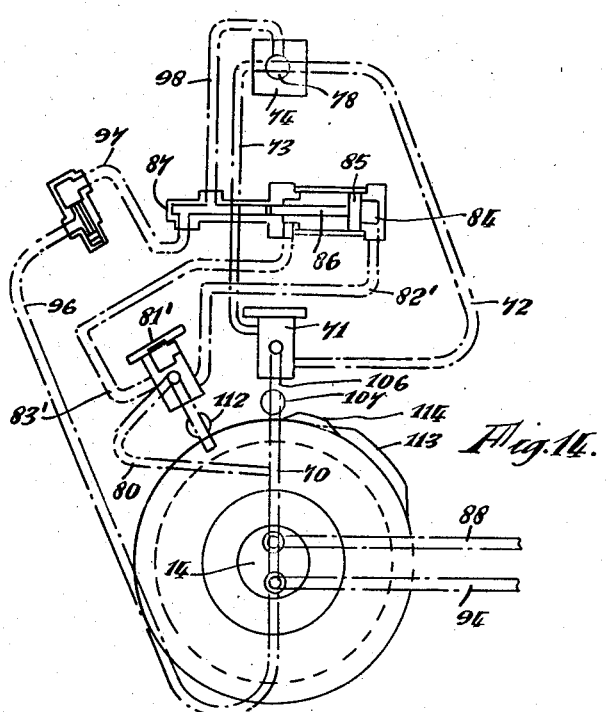
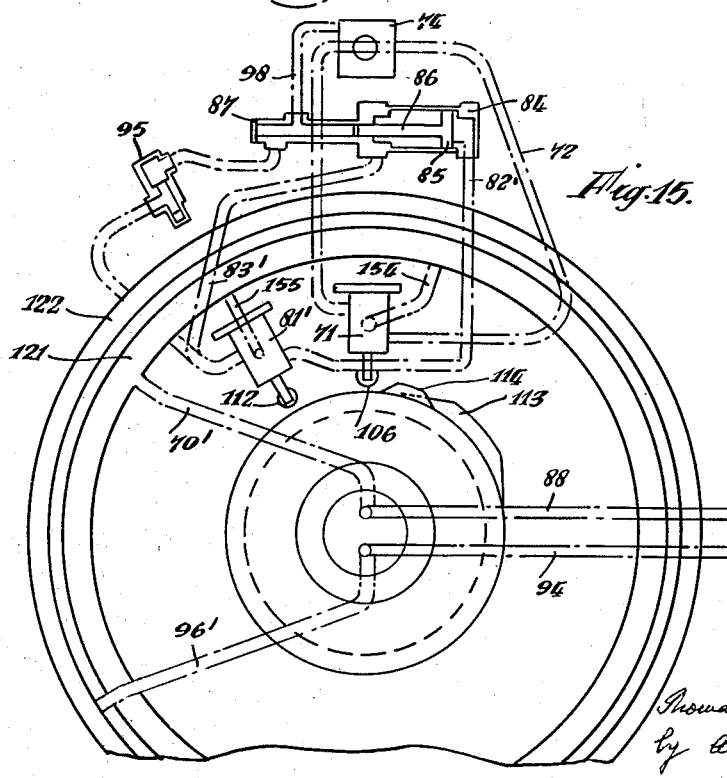

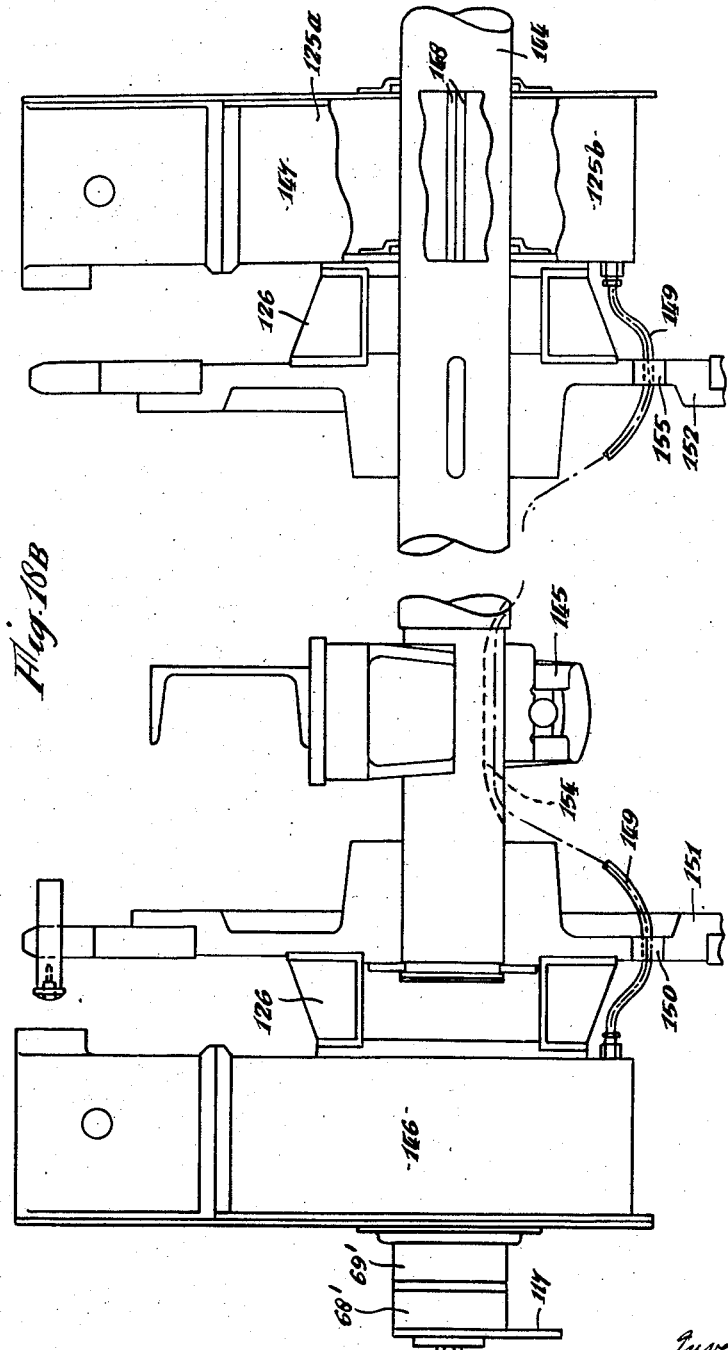

United States Patent Office 2,920,720
Patented Jan. 12, 1960

2,920,720

LUBRICATORS FOR SPROCKET CHAINS

Thomas Bentham Hemsley, South Gosforth, Newcastle Upon Tyne, England, assignor of one-half to Clarke, Chapman & Company Limited, Victoria Works, Gateshead, England, a company of Great Britain and Northern Ireland Application December 18, 1957, Serial No. 703,576

Claims priority, application Great Britain June 1, 1954

26 Claims. (Cl. 184—15)

This invention relates to lubricators for the pivot pins of roller chains and of rotary elements, such as load carrying rollers, associated with such chains, and in particular to lubricators (hereinafter referred to as lurbicators of the kind described) which are operable whilst the chain is in motion about a sprocket and especially suitable for automatic lubrication of precision type conveyor chains and associated rotary elements provided with lubricant receiving nipples. This application is in part a continuation of my application Serial No. 512,091, filed May 31, 1955 (now abandoned).

An object of the invention is to provide a sprocket chain lubricator comprising the combination with a sprocket wheel, a chain carried about said sprocket wheel, and lubricant-receiving nipples on said chain, of a rotatable carrier mounted co-axially with said sprocket wheel, at least one lubricant-charging unit movably supported by said carrier, means synchronising rotation of said carrier with that of said sprocket wheel to locate said charging unit in opposition to one of said nipples as it travels around the sprocket wheel, means to move said charging unit into and from engagement with the opposed nipple, means supported by and rotating with said carrier for forcing lubricant through said charging unit into said nipple, and means operating said forcing means while said nipple is engaged by said charging unit.

Another object of the invention is to provide a sprocket chain lubricator comprising the combination with a shaft, a sprocket wheel on said shaft, a chain carried about said sprocket wheel, and lubricant-receiving nipples on said chain, of an extension on said shaft, a sleeve mounted about said extension, a rotatable housing mounted about said sleeve co-axially with said sprocket wheel, at least one lubricant-charging unit movably supported by said housing, means synchronising rotation of said housing with that of said sprocket wheel to locate said charging unit in opposition to one of said nipples as it travels around the sprocket wheel, means including a lever connected with said charging unit, an annular cam mounted on said sleeve, a follower carried by said lever and engaging said cam, to move said charging unit into and from engagement with the opposed nipple, an injector ram in and rotating with said housing for forcing lubricant through said charging unit into said nipple, and a second cam mounted on said sleeve and engaging said ram to operate it while said nipple is engaged by said charging unit.

It has been found that with small sprockets of 18" pitch circle diameter the design and arrangement of the actuating levers in means as last recited presented certain difficulties owing to the small space available, whilst with sprockets having a pitch circle diameter of 6' 0" or more these mechanisms present even greater problems in the design of the levers and cams.

Another of the objects of the present invention is accordingly to provide an improved lubricator of the kind described, of simplified construction which will overcome some of the above disadvantages, wherein engagement and disengagement of at least one lubricant charging unit with and from an opposed lubricant receiving nipple, and forcing of lubricant through the charging unit into a nipple when engaged by said unit, are effected by means operated by a pressure fluid under the control of valve means which are operable by the rotation of the lubricator.

Yet another object of the invention is to provide a lubricator of the kind comprising a rotatable carrier mounted co-axially with the sprocket wheel carrying the chain of which the rollers or associated elements are to be lubricated, at least one lubricant-charging unit movably supported by said carrier in opposition to and adapted to be engaged with an opposed lubricating receiving nipple, fluid operable movement means rotating with said carrier for moving said charging unit into and from engagement with the opposed nipple, fluid operable lubricant forcing means rotating with said carrier for forcing lubricant through the charging unit into the nipple whilst engaged by said unit, lubricant conduits connecting said forcing means with a source of supply of lubricant under moderate pressure and with said charging unit, a source of pressure fluid for actuating said charging unit movement means and said lubricant forcing means, fluid conduits connecting said movement means and forcing means to said source of pressure fluid and valve means in said fluid conduits controlled by the rotation of said carrier.

In a lubricator as aforesaid, the timing of the forcing of lubricant may be controlled by other valve means which are located between said lubricant forcing means and charging unit and are operable by the rotation of the lubricator.

Said carrier may be mounted on said sprocket or may be mounted for axial relative movement so as to be movable into and out of the operative position.

The foregoing and other objects of the invention will be better understood from the following description of various embodiments thereof by way of example with reference to the accompanying drawings, wherein:

Fig. 4 is a similar view to Fig. 1 illustrating a modified construction.

Fig. 5 is a section on the line V—V in Fig. 4.

Fig. 6 is a fragmentary section on the line VI—VI of Fig. 4, and

Fig. 7 is a section on the line VII—VII of Fig. 6.

Fig. 10 is a longitudinal sectional view of a piston valve in a compressed air circuit.

Figs. 12 and 13 are diagrammatic views similar to Figs. 8 and 9 of a modified form of lubricator made in accordance with the present invention as applied to a sprocket having a rotating shaft.

Figs. 14 and 15 are diagrammatic views, corresponding respectively to Figs. 9 and 13, of modified pressure fluid and lubricant circuits.

Figs. 18A and 18B are a diagrammatic elevation of lubricating means applied to three sprockets mounted on a common shaft. These two figures are continuations of one another and are to be considered as one figure.

Figure 1:
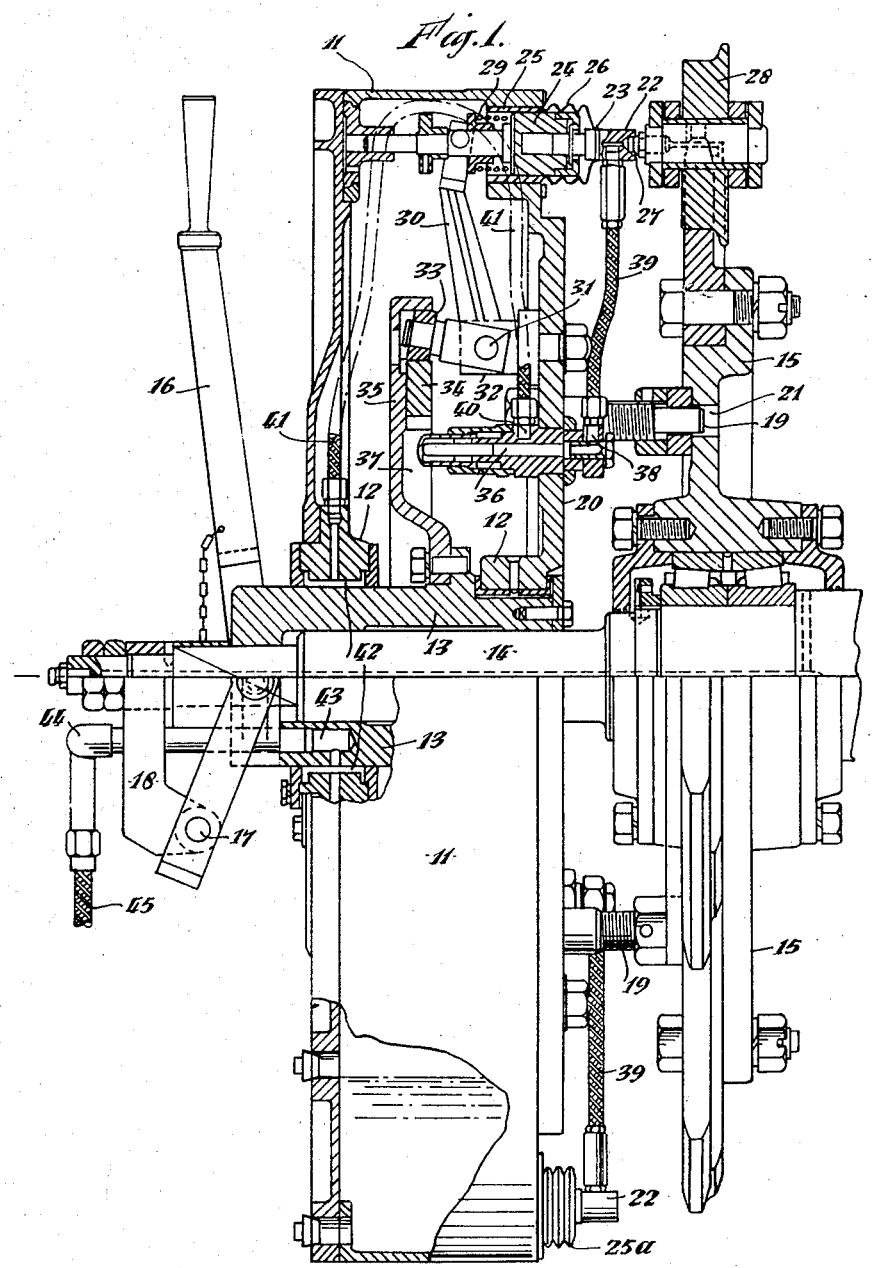
Fig. 1 is a side elevation, partly in section.
Figure 2:
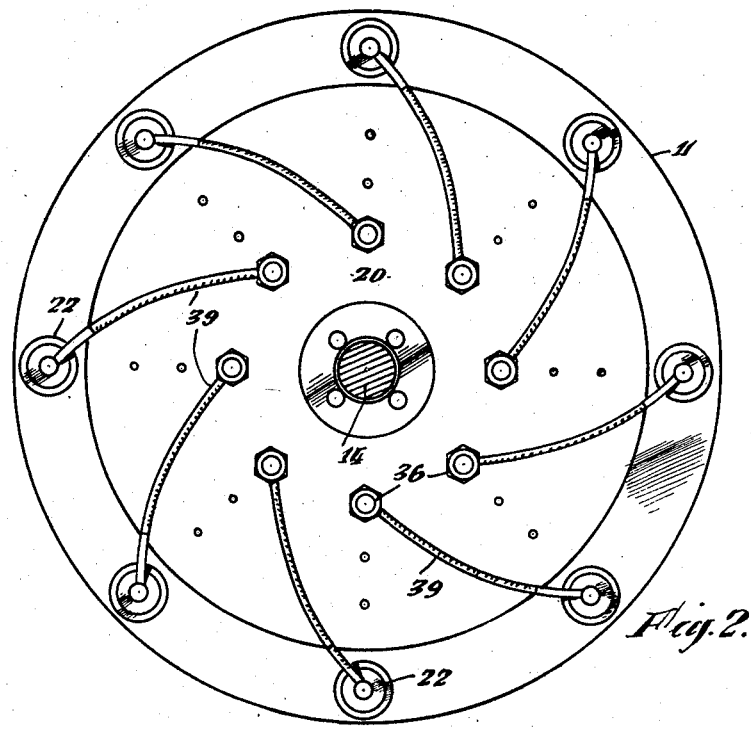
Figs. 2 and 3 are elevations to a smaller scale looking on the left- and right-hand faces thereof respectively, illustrating one construction of lubricator for sprocket chains of the roller type in accordance therewith.
Figure 3:
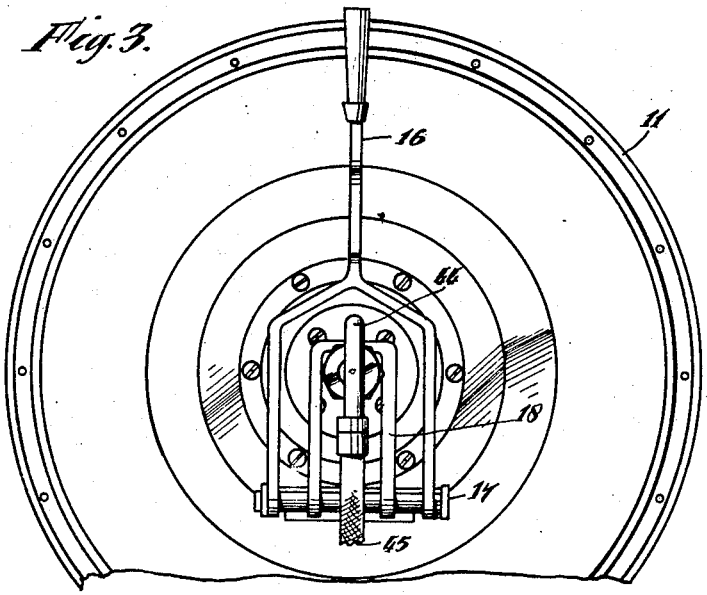

Referring firstly to Figs. 1–3, in the example shown therein, the carrier of our automatic lubricator comprises an annular housing 11 which is rotatable on bearing bushes 12 about a sleeve 13 on the stationary shaft 14 on which the sprocket wheel 15 revolves. A clutch handle 16 pivoted on a pin 17 carried by a bracket 18 on the end of the shaft is adapted to slide the sleeve 13 and hence the housing axially of the shaft to engage a pair of diametrically-opposite pins 19 projecting from the right-hand wall 20 of the housing adjacent to the sprocket wheel with corresponding holes 21 in the latter and thereby couple the housing to the wheel so that the housing and sprocket wheel rotate as one. Reverse movement of the clutch handle slides the housing to the left and disengages the pins 19 from their holes and hence frees the housing from the wheel.

Equidistantly-spaced charging units 22 are provided around the periphery of the right-hand wall 20 of the housing, each unit comprising a spring-loaded self-centering nipple connector 23 mounted so that it can float radially in a cap 24a on the outer end of a plunger 24 which is displaceable axially in a bearing 25 in the housing to which said connector is attached by a bellows-type seal 26. When the plunger is projected, the connector which has a bell mouth engages and centres itself correctly on the opposed nipple 27 on the spindle of the chain roller 28 on the sprocket wheel 15. The plunger 24 is moved axially in its bearing through the intermediary of a compression spring 29 which compensates for any differences in the heights of the nipples, by one arm of a bellcrank lever 30 pivoted at 31 in a bracket 32 rigidly bolted to the internal face of the right-hand wall of the housing. The other arm of the bellcrank lever is provided with a roller 33 engaging a circular cam path 34 formed around the face of a disc 35 fixed on the sliding sleeve 13 within the housing. Co-action of the cam path and roller oscillates the lever 30 to project and withdraw the nipple connector 23.

Operating in conjunction with each nipple connector is an injector ram 36 actuated by a striking cam 37 on the disc 35 on the sliding sleeve, said ram being adapted to force lubricant through a non-return valve 38 into a flexible pipe 39 adapted to convey lubricant to the nipple connector 23, which elements 38, 39 and 23 are the only parts of the lubricator not enclosed by the housing 11. A supply of lubricant is fed to the injector ram 36 through a non-return valve 40 at one end of a flexible pipe 41 within the housing arranged to clear the periphery of the disc 35 on the sliding sleeve, the other end of said pipe being connected to a collector manifold 42 provided in the housing bearing 12 which is farther from the sprocket wheel. The manifold has a suitably sealed connection to a lubricant duct 43 in the sliding sleeve 13, said duct being connected by a pipe 44 and a flexible tube 45 to a lubricant supply from a standard pump.

Where the sprocket wheel 15 has for example eight teeth, the housing 11 is provided as shown in Fig. 2 with eight charging units 22 and their connections, and, in operation, as the housing revolves with the sprocket wheel, the nipple connectors 23 are engaged with the nipples 27 of the chain rollers 28 on the wheel by the action of the cam path 34 on the bellcrank levers 30. The striking cams 37 then cause the injector rams 36 to force charges of lubricant past their non-return valves 38 and through the external pipes 39 into the nipple connectors and hence to the nipples of the chain rollers. The period of application of the connectors 23 to their opposed chain roller nipples is determined by the cam path 34 and, at the end of said period, the connectors are withdrawn and the injector rams 36 released, the latter being re-charged with pressure lubricant from the supply pump.

In the modified arrangement shown in Figs. 4 and 5 only one charging unit 22 is provided, and, while the construction of this unit is the same as that shown in Figs. 1–3, the means for operating and feeding this single unit are modified. In place of the bellcrank lever 30, I provide for moving the plunger 24 axially in its bearing 25 a lever 48 forked at one end and pivoted on a pin 49 mounted across a V-section extension 50 of a reduced annular housing 51, the other end of said lever being provided with a roller 52 bearing on a cam path 53 formed on a flange 54 of the sliding sleeve 13 on the stationary shaft 14. A spring 55 controls the oscillation of the lever 48.

Lubricant is fed to the charging unit 22 through a check valve 56 serving to build up charging pressure in a flexible tube 57, by an injector ram 58 reciprocated by a cam 59 provided on the sleeve 13 clear of the flange 54, said ram being fed by a flexible tube 60 from the collector manifold 42. In other respects the arrangement of Figs. 4 and 5 is the same as that of Figs. 1–3 except that only a single locking pin 19 is provided.

In both constructions, the face of the sprocket wheel 15 is provided with a tapered groove 61 as shown in Figs. 6 and 7 leading to the hole 21 for the pin 19 thereby guiding said pin into the hole.

In operation, the housing 51 of the arrangement shown in Figs. 4 and 5 is, by means of the clutch handle 16, moved axially on the sleeve 13 to bring its pin 19 against the face of the revolving sprocket wheel 15. The pin engages the groove 61 and is guided thereby into the hole 21 in said face thereby locking the housing to the wheel with its charging nipple opposite to a nipple 27 on the spindle of a chain roller 28. At intervals predetermined by the cam path 53, the lever 48 is caused to project the charging unit 22 into engagement with the nipple 27. At the same time the cam 59 causes the injector ram 58 to feed lubricant through the tube 57, check valve 56 and unit 22 to said nipple. The period of application of the charging unit to the nipple is determined by the cam path 53, and, at the end of said period, the unit is withdrawn from the nipple. The charging operation is repeated each time the roller 52 of the lever 48 is oscillated by the cam path, and, as the nipple of a different chain roller is in alignment with the unit when each oscillation occurs, all the chain rollers are in due course lubricated. For example, if there are 9 teeth around the sprocket wheel and say 80 rollers in the chain, all the rollers will be lubricated in the course of 79 rotations of the sprocket wheel.

It will be understood that a similar lubricator is provided in association with the complementary sprocket wheel for independently lubricating the rollers of the complementary chain of the conveyor.

In the form shown in Figs. 8 to 11 of the drawings, the automatic lubricator comprises an annular housing 62 which is secured by a flange 63 to a chain sprocket 15 rotating on a bush 8 on a stationary shaft 14 the end of which is drilled to form an air passage 64 and a lubricant passage 65 having outlets 66 and 67 respectively at the periphery of said shaft. Mounted to rotate on said stationary shaft and secured to said annular housing are an air manifold 68 and lubricant manifold 69 which are combined in a single unit each manifold being provided with packing glands to make fluid tight connection with the said stationary shaft 14. An air pipe 70 leads from the air manifold 68 to a cylinder 71 of a piston valve, the piston of which is shown in Fig. 10 to be described more fully hereafter. From the cylinder 71 pipes 72 and 73 lead to opposite ends of the cylinder 74 of a double acting ram having a piston 75 and piston return spring 76. The piston rod 77 of piston 75 carries a self-centering nipple connector 78 shown in Fig. 8 in the withdrawn position. Branches 82 and 83 from the pipes 72 and 73 go to opposite ends of the cylinder of a double acting ram 84 in which is a piston 85 the rod 86 of which constitutes the plunger of grease ram 87. As will be seen in Fig. 9, an air line 88 connects the air passage 64 in the shaft 14 to a valve 89 in the delivery pipe 90 of an air compressor 91 having stop and start switch 92. The compressor 91 can be dispensed with if there is already available a compressed air mains supply. The delivery pipe 90 also feeds a compressed air operated grease pump 93 which is connected to the lubricant passage 65 in the stationary shaft 14, by a pipe 94. The grease manifold 69 is connected to the inlet side of the ram chamber of the ram 87 via a non-return valve 95 by the pipes 96 and 97. The whole of the grease circuit so far described is maintained constantly at the same pressure as the output of the grease pump 93. The outlet port of the grease ram 87 is connected by a pipe 98a to the cylinder of a piston valve 81 the arrangement of which is to be seen more clearly in Fig. 11 to be described shortly in greater detail. The outlet port of the valve cylinder 81 is connected by a flexible pipe 98b to the self-centering connector 78.

Fig. 10 shows the piston for the valve 71 of the air cylinder 74 which has five ports 100, 101, 102, 103 and 104 respectively. The port 100 (which extends perpendicularly to the plate wherein the other four ports are located) is coupled to the pipe 70 from the air manifold 68, the port 101 is coupled to the pipe 72 and the port 102 to the pipe 73. The ports 103 and 104 are exhaust ports. The piston 105 is divided into two sections which control the ports 101, 104 and 102, 103 respectively and the piston rod 106 carries a cam roller 107. In the position in which the piston 105 is shown, compressed air is being admitted to the back of the piston 75 (Fig. 8) and the connector 78 is therefore being held fully withdrawn both by the compressed air and by the piston return spring 76.

Figure 11:
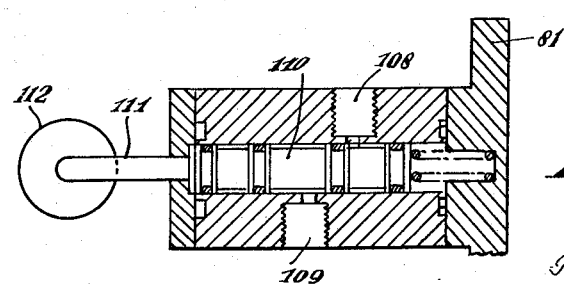
Fig. 11 is a longitudinal sectional view of a piston valve in a lubricant circuit.

Turning now to Fig. 11, the valve 81 has only two ports namely an inlet port 108 to which the pipe 98a is coupled and an outlet port 109 to which the pipe 98b connects. The piston 110 has its piston rod 111 fitted with a cam roller 112.

Returning to Fig. 9, it will be seen that the shaft 14 is fitted with two cams 113 and 114 for the control of the air and grease piston valve 71, 81, respectively. The lift portion of the cam 113 is slightly in advance in timing of that of the cam 114 and is of longer duration so that the connector 78 is moved forward into engagement with a nipple 27 and held there whilst the ram 86 is operated.

Figure 13:
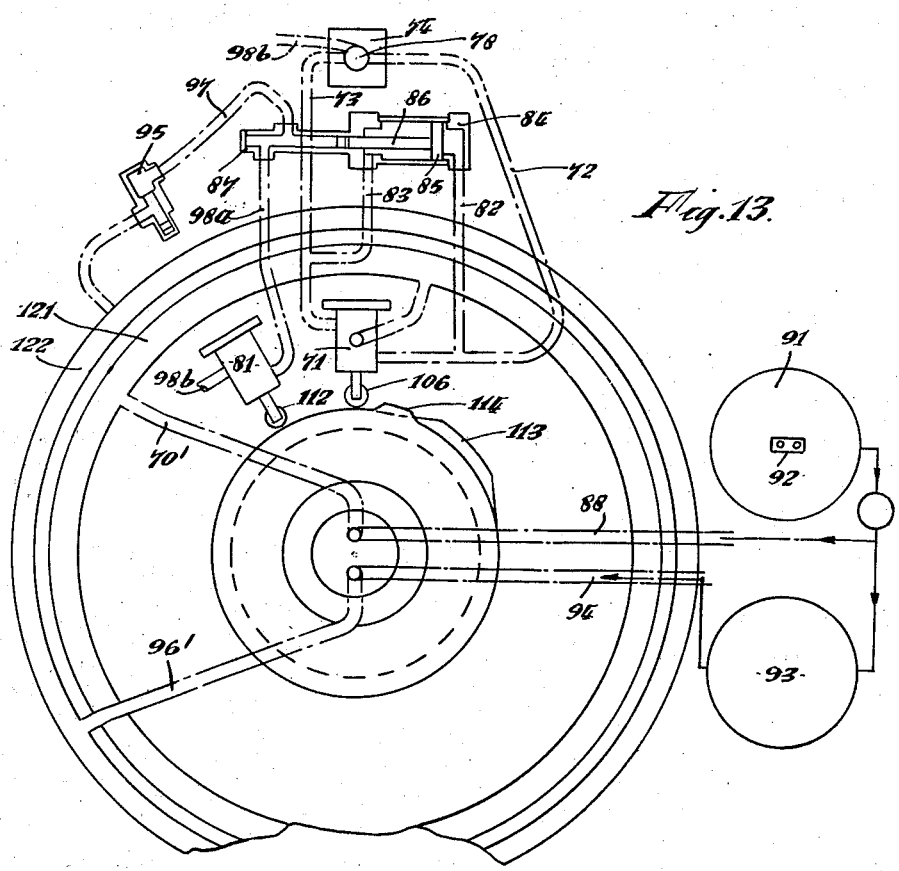

Referring now to the modified arrangement shown in Figs. 12 and 13, it will be seen that the same numerals have been applied to these figures for the same parts or substantially the same parts as are seen in Figs. 8 to 11. The changes in construction have been occasioned by the fact that the shaft 14' rotates and accordingly the cams 113 and 114 are formed on a sleeve 115 hving a bush 116 in which the shaft 14' is free to rotate, the sleeve 115 having secured to it an arm 117 drilled at 118 to receive an anchor pin by which the said arm and the said cams are held stationary. The air and grease manifolds 68' and 69' respectively are situated outside the annular housing 62' and are stationary and the air and lubricant passages 64' and 65' are closed by plugs 119 and 120 respectively. Since the annular housing 62' rotates with the shaft 14' the pipes 70' and 96' are tapped directly into the passages in the shaft 14' but instead of being carried direct to the cylinder 71 and non-return valve 95 respectively, they are connected to annular pipes 122 and 121 which are mounted concentrically in the annular housing 62' so that any number of such cylinders and valves may be coupled thereto.

In both examples the connectors 78 are shown fitted with dust excluding bellows 123 each connector having immediately opposite it the nipple 27 of a pivot of a roller 28 in the chain to be lubricated.

In operation when the roller 107 is raised by the cam 113, which takes place before the roller 112 is raised by the cam 114, the port 104 is closed and the port 101 opened so that pressure air is admitted to the reverse side of the piston 75 while the port 102 is put in communication with the port 103 so that the piston rod end of cylinder 74 is open to exhaust, and connector 78 is thrust firmly onto the nipple 27 and will be held there until the roller 107 is lowered again. It will also be clear from Fig. 9 that when the piston valve 71 is opened to admit pressure air to the pipe 72 it also simultaneously admits pressure air by the pipe 82 into the cylinder 84 behind the piston 85 and applies a heavy thrust on the ram 86. Since any lubricant which has entered the ram chamber 87 via the pipes 96 and 97 under pressure from the grease pump 93 cannot return because of the action of the non-return valve 95 the grease is momentarily trapped in the pipe 70 under heavy pressure. However, very shortly after the grease in the pipe 98a has been placed under pressure by the ram 86 the cam roller 112 is raised by the cam 114 placing the port 108 in direct communication with the port 109 and allowing the grease to pass up the pipe 98b to the connector 78 and thence into the nipple 27.

Automatic operation of the device takes place therefore as soon as the valve 89 in the pipe line 90 from the compressor 56 is opened and lubrication will cease immediately this valve is closed, consequently there is no need to provide for any axial movement of the annular casing 62 in order to render the device inoperative. It is, of course, to be realised that when the air pressure in the system is shut off the return spring 76 will hold the connector 78 in the fully withdrawn position so that it cannot contact any of the nipples. The advantage of making the cylinder 74 double acting is to ensure a more speedy return of the piston 75 after the supply of pressure air to the pipe 72 has been cut off in the valve 71 by the piston 105 and the port 104 opened to connect the said pipe to the exhaust.

Figure 8:
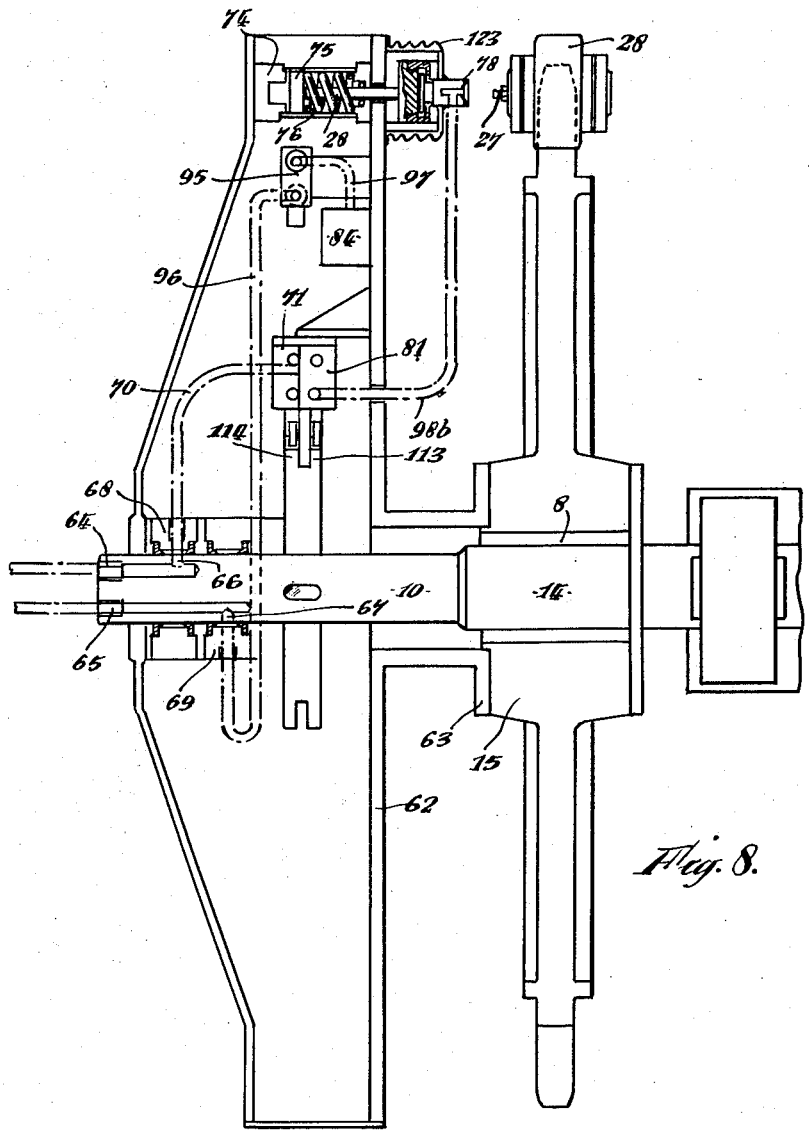
Fig. 8 is a diagrammatic sectional elevation of one form of compressed air actuated lubricator made in accordance with the present invention, mounted for rotation with a sprocket on a stationary shaft.
Figure 9:
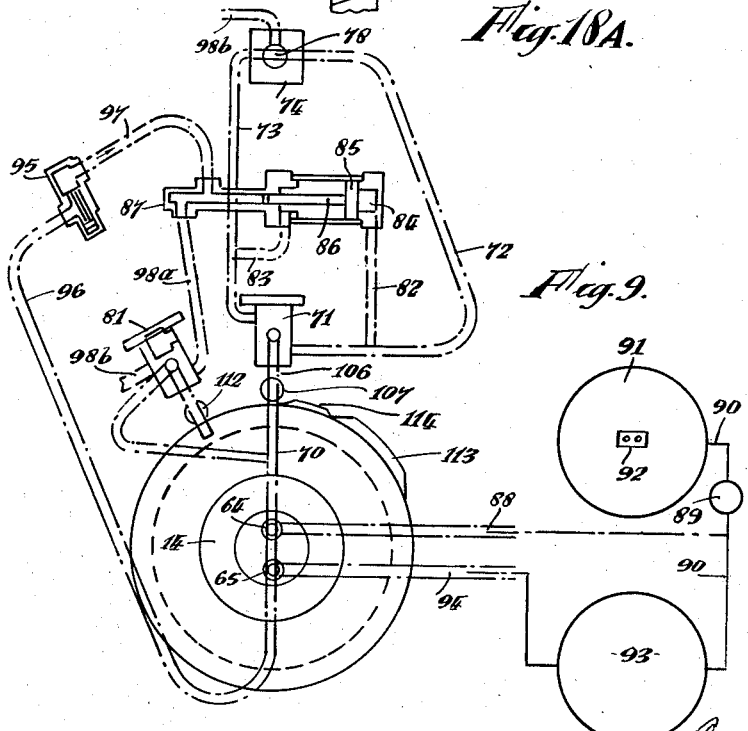
Fig. 9 is a diagrammatic front view of the pressure fluid and lubricant circuits.

In the arrangement shown in Fig. 14, the circuits of Fig. 9 are modified to eliminate the passage of grease through one of the cam-operated valves and to use these valves for individual operation of the two cylinders. Thus, a branch 80 from the air pipe 70 goes to an inlet port of the valve 81', which has five ports as above described with reference to Fig. 10, namely said inlet port 100, delivery ports 101 and 102, and exhaust ports 103 and 104. The ports 101 and 102 are connected by pipes 82' and 83' to opposite ends of the cylinder 84 (pipes 82 and 83 of Fig. 9 being eliminated). Further, the delivery pipe 98 from the grease ram 87 goes direct to the connector 78 (in place of the pipe 98a shown in Fig. 9 connecting the ram to the valve 81). The effect of this rearrangement is that the cylinder 74 is first operated to force the connector 78 into engagement with the nipple 27, under control of the valve 71 actuated by cam 113, the cylinder 84 is then operated to force grease through the connector into the nipple and the piston rod 86 is then withdrawn, both under control of the valve 81' actuated by cam 114, and the cylinder 74 is finally operated to withdraw the connector 78 to the position shown in Fig. 8.

A similar modification of the circuits of Fig. 13 is shown in Fig. 15 wherein reference numerals are the same as those of equivalent parts in Fig. 14. Air supply pipes 154 and 155 lead from the annular air pipe 121 to the inlet ports of five-port valves 71 and 81', while the grease after passing from the annular grease pipe 122 through the non-return valve 95 to the ram 87, is delivered from said ram chamber by the pipe 98 direct to the connector 78. The sequence of operations is the same as above described with reference to Fig. 14.

Figure 16:
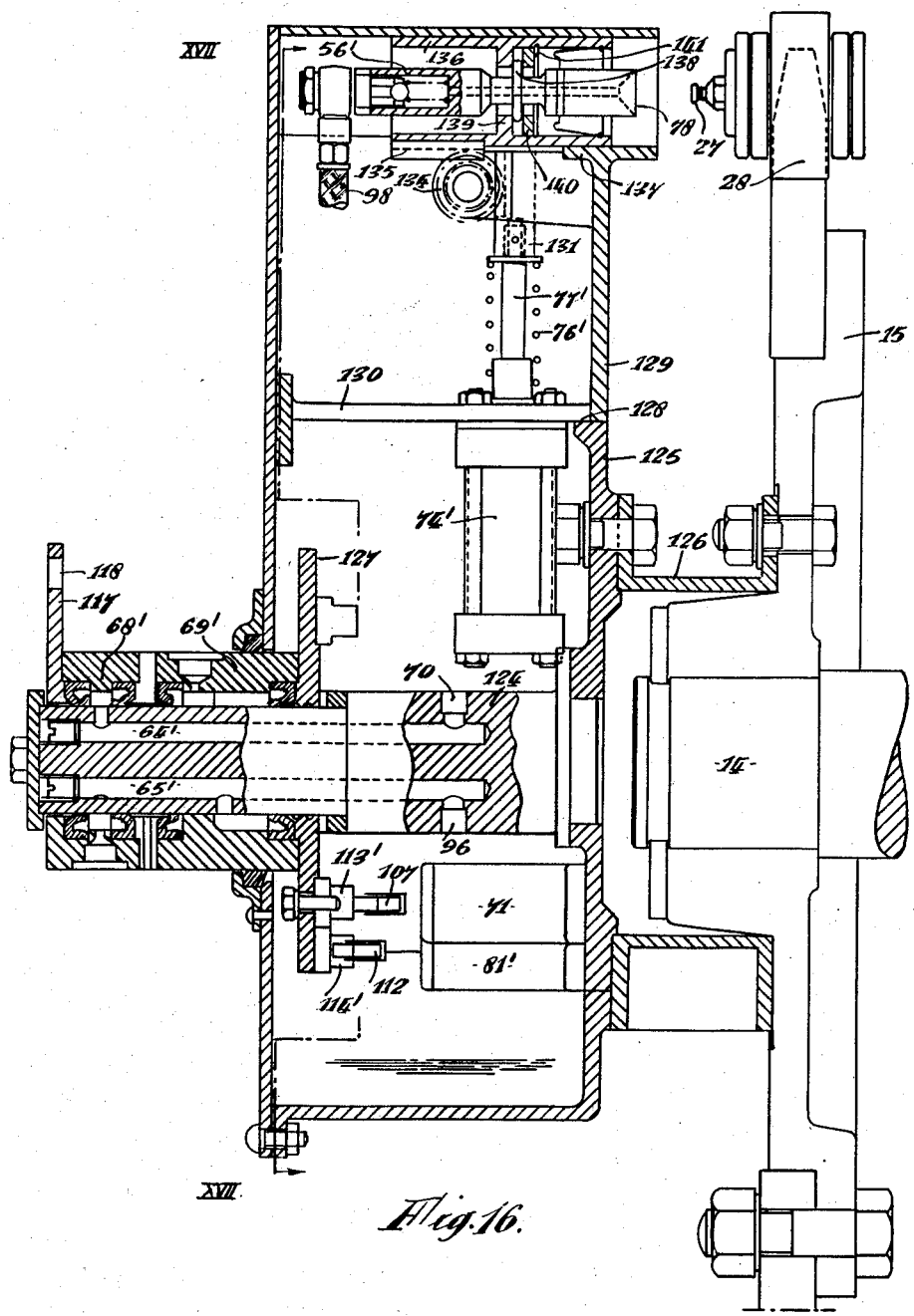
Fig. 16 is a diagrammatic section of a further modified form of lubricator as applied to a sprocket mounted on a shaft (whether rotating or stationary) having no extension whereon the lubricator is mountable.
Figure 17:
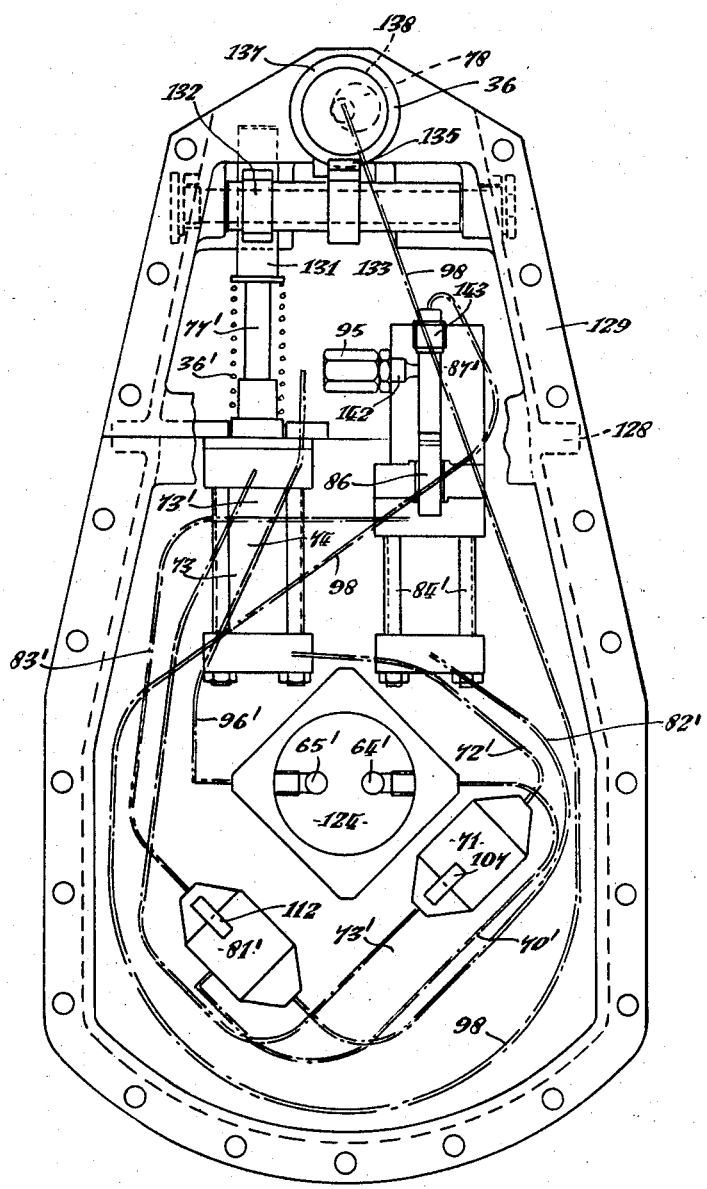
Fig. 17 is a section on the line VIII—VIII of Fig. 7.

Figs. 16 and 17 illustrate diagrammatically a practical variant of the device above described with reference to Fig. 15, equivalent parts being marked with corresponding reference numerals. This variant embodies only one nipple connector 78, like the lubricator described with reference to Figs. 1 to 3, for use where, for example, the number of links in, or other rotary elements associated with, an endless chain is not a multiple of the number of teeth on the sprocket wheel, the single charging unit engaging with a different lubricant receiving nipple in each revolution of the chain until the cycle is completed and all the nipples have been lubricated.

The shaft 14 of the sprocket wheel 15 has no extension beyond the sprocket, and accordingly the housing body 125, which is attached to the sprocket 15 by a spool 126, has secured within it a stub shaft 124, which of course rotates with the lubricator.

The circuit arrangements for air and grease are similar to those described with reference to Fig. 15, except that the annular pipes 121 and 122 of Fig. 15 are omitted, since it is required to supply only one charging unit 78.

The non-rotating air and grease manifolds 68' and 69' are mounted on the outer end of the shaft 12 with the arm 117 which is secured by an element engaging the hole 118 to prevent rotation. The cams 113' and 114' in this arrangement are face cams secured to a disc 127 within the housing body at the inner end of the air manifold. The air and grease passages 64' and 65' extend within the shaft 124 and have at their inner ends lateral branches for the connection of pipes 70' and 96'. The valves 71 and 81' are mounted on the inner wall of the housing 125 so that their actuating rollers 107 and 112 are located in the paths of the cams 113' and 114' respectively.

The housing body 125 has an open outer end, to which is secured a housing cap 129 having at its inner end a transverse plate 130 to which are bolted the outer ends of the air ram 74' and grease ram 84'. The piston rod ends of these rams project through the plate 130. The piston rod 77' of the air ram 74', which is surrounded by the return spring 76', projects outwardly and has at its outer end a rack 131 engaging a pinion 132 on a transverse shaft 133. This shaft also carries a pinion 134 engaging a rack 135 which is secured to a bush 136 slidable axially and horizontally in a cylindrical guide 137 at the outer end of the cap 129. The connector 78 is mounted in the bush 136 by means of a flange 138 bearing against a shoulder 139 within the bush and secured with freedom to float radially by a loose ring 140 which is located by a circlip 141. The extent of the radial displacement permitted is indicated in Fig. 16.

The air supply pipe 70' is as shown in Fig. 17 connected to the side inlet ports of the valves 71 and 81'. From the valve 71 air delivery pipes 72' and 73' extend to opposite ends of the air ram 74', while the air delivery pipes 82 and 83 extend to the opposite ends of the operating cylinder 84 of the grease ram 87 from the valve 21.

The grease supply pipe 96' extends from the grease duct 65' to the non-return valve 95 which is screwed directly into inlet branch 142 of the ram chamber 87, at the end of which is located the grease delivery port 143 which is connected by the flexible pipe 98 to non-return valve 56' screwed directly into the rear end of the connector 78.

Subject to the evident modification of the means for operating the connector 78 through the rack and pinion mechanism 131—135, the apparatus shown in Figs. 16 and 17 operates in the manner described with reference to Fig. 15, charging of each successive nipple with lubricant being effected while the nipple is travelling counter-clockwise through an arc of about 90° from the horizontal up to the vertical position shown in Fig. 17, at which position the connector 78 is retracted as shown in Fig. 16 and the roller 28 in the spindle of which the nipple 27 is located is about to leave the sprocket 15.

Preferably, in this arrangement, the valve 71 controlling the air ram 74' is arranged, so that it retracts the connector 78 when the roller 107' is depressed by the cam 113'. Thus it is impossible for the mechanism to jam with the connector 78 projected, since the cam 113' serves at each revolution to cause the connector 78 to be withdrawn.

Figure 18A:
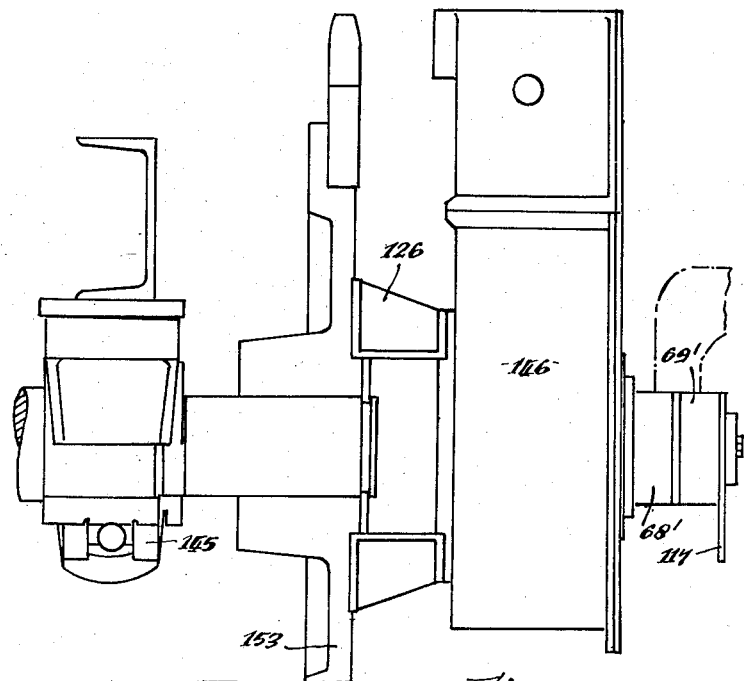

Figs. 18A and 18B show diagrammatically an arrangement of three lubricators as last described for the lubrication of chains (or rotary elements associated therewith) running on three sprockets 151, 152 and 153 mounted on a common shaft 144 supported in bearings 145. The outer lubricators 146 are as described with reference to Figs. 16 and 17 and the intermediate lubricator 147 is of similar construciton except that for convenience of mounting or removal the housing body is divided into two parts 125a and 125b secured together by bolting through lateral flanges 148 about the shaft. Each of the outer lubricators 146 has air and grease manifolds 68' and 69' held stationary by an arm 117. The intermediate lubricator 147 has no manifolds such as 68', 69', no cams such as 113', 114' and no pneumatic valves such as 71, 81', but is supplied with air and grease through the left hand lubricator 146 by way of pipes 149, of which only one is shown, extending through a hole 150 in the sprocket 151, a spline 154 formed in the portion of the shaft 144 located within the left hand bearing 145, and a hole 155 in the sprocket 152. Two air pipes extend from each of the valves 71, 81' of the left hand lubricator to the rams 74', 84' of the intermediate lubricator, and a grease pipe extends from the grease duct branch 96 of the left hand lubricator to non-return valve 95 on the ram 87 of the intermediate lubricator.

Evidently an arrangement as shown in Figs. 18A and 18B could be employed for lubrication of chains running on four sprockets, the left hand intermediate lubricator being connected as described to the left hand outer lubricator, and a further right hand intermediate lubricator being similarly connected to the right hand outer lubricator.

In the arrangements described above the engaging and disengaging of said lubricant-charging unit with and from an opposed chain nipple and operation of said lubricant forcing means are controlled without the employment of levers or lubricant forcing cams.

It will also be realised that for various reasons such as differences in the length of the nipples or of the axial positioning of the pivot pins in the links or lateral movement of the chain on the sprocket, the nipple ends do not lie in precisely the same plane. The air operated nipple connector will adjust itself automatically to such variations within the limits of its stroke.

The invention further enables the automatic lubrication of more than two chains while in motion around sprockets mounted on a stationary common shaft.

Thus in an arrangement having a stationary shaft as described with reference to Fig. 8 the air and lubricant passages 64 and 65 may be extended from at least one end of the shaft towards the middle thereof and provided at their inner ends and intermediate locations as desired with lateral branches such as 66 and 67 in register with air and lubricant manifolds 68' and 69' in a lubricator attached to an intermediate sprocket, or each of a plurality of such lubricators.

When more than two chains mounted on co-axial sprockets are to be lubricated, the usual arrangement will be that a pair of sprockets are located one at each end of the shaft, with one or more sprockets located between them. In such arrangement having a stationary shaft air and lubricant passages on one end of the shaft may serve to supply only the lubricator at that end, while air and lubricant passages provided in the other end of the shaft are extended inwardly to supply a lubricator at said other end and at least one other intermediate lubricator. Alternatively, the air and lubricant passages may extend completely through the shaft, air and lubricant being supplied each to both ends of one of the passages or one end of each passage being plugged and the air and lubricant supplied only to the other end.

In an arrangement with a rotating shaft the air and lubricant passages may likewise extend completely through the shaft, with both ends plugged, said passages being supplied by air and lubricant manifolds either at one end or at both ends of the shaft.

The invention is also applicable to the lubrication of rotary (including oscillatory) elements associated with endless chains such as rollers which engage guide rails to support a conveyor movable by the chain or spindles which interconnect elements of such a conveyor, or rollers of bogeys which carry suspended objects and are traversed by an endless chain, and are provided with lubricant receiving nipples. It will be understood that in such applications the fluid operable means serving to move the or each charging unit may have a stroke of any required length, and may be disposed on an axis oblique to the axis of the chain sprocket shaft so as to be able to move the nipple connector into engagement with a nipple to which access in a direction parallel to the shaft is obstructed.

What I claim and desire to secure by Letters Patent is:

1. A sprocket chain lubricator comprising the combination with a sprocket wheel, a chain carried about said sprocket wheel, and lubricant-receiving nipples on said chain, of a rotatable carrier mounted co-axially with said sprocket wheel, at least one lubricant-charging unit movably supported by said carrier, means synchronising rotation of said carrier with that of said sprocket wheel to locate said charging unit in opposition to one of said nipples as it travels around the sprocket wheel, means to move said charging unit into and from engagement with the opposed nipple, means supported by and rotating with said carrier for forcing lubricant through said charging unit into said nipple, and means operating said forcing means while said nipple is engaged by said charging unit.

2. A sprocket chain lubricator comprising the combination with a toothed sprocket wheel, a link chain carried about said sprocket wheel, the number of links in said chain being other than a multiple of the number of teeth in said sprocket wheel, and lubricant-receiving nipples between each pair of said links, of a rotatable carrier mounted co-axially with said sprocket wheel, one lubricant-charging unit movably supported by said carrier, means synchronising rotation of said carrier with that of said sprocket wheel to locate said charging unit in sequence in opposition to each of said nipples as it travels around the sprocket wheel, means to move said charging unit into and from engagement with the opposed nipple, means rotating with said carrier for forcing lubricant through said charging unit into each of said nipples, and means operating said forcing means while each of said nipples is engaged by said charging unit.

3. A sprocket chain lubricator comprising the combination with a toothed sprocket wheel, a chain carried about said sprocket wheel, and lubricant-receiving nipples on said chain, of a rotatable carrier mounted co-axially with said sprocket wheel, a plurality of lubricant-charging units, movably supported by said carrier, said units being spaced to correspond to the positions of teeth of the sprocket wheel, means synchronising rotation of said carrier with that of said sprocket wheel to locate said charging units each in opposition to one of said nipples as it travels around the sprocket wheel, means to move each of said charging units into and from engagement with the opposed nipple, means rotating with said carrier for forcing lubricant through each of said charging units into the nipple thereby engaged, and means operating said forcing means while the nipple is engaged by said charging unit.

4. A sprocket chain lubricator comprising the combination with a shaft, a sprocket wheel on said shaft, a chain carried about said sprocket wheel, and lubricant-receiving nipples on said chain, of an extension on said shaft, a sleeve mounted about said extension, means for displacing said sleeve axially relative to the sprocket wheel, a rotatable carrier mounted about said sleeve co-axially with said sprocket wheel, at least one lubricant-charging unit movably supported by said carrier, means synchronising rotation of said carrier with that of said sprocket wheel to bring said charging unit into opposition to one of said nipples as it travels around the sprocket wheel, means to move said charging unit into and from engagement with the opposed nipple, means rotating with said carrier for forcing lubricant through said charging unit into said nipple, and means operating said forcing means while said nipple is engaged by said charging unit, said sleeve displacing means serving to render operative and inoperative when desired said unit moving means and said lubricant forcing means.

5. A sprocket chain lubricator comprising the combination with a sprocket wheel, a chain carried about said sprocket wheel, and lubricant-receiving nipples on said chain, of a rotatable housing mounted co-axially with said sprocket wheel, at least one lubricant-charging unit movably supported by said housing, means synchronising rotation of said housing with that of said sprocket wheel to locate said charging unit in opposition to one of said nipples as it travels around the sprocket wheel, means located within said housing to move said charging unit into and from engagement with the opposed nipple, means within said housing for forcing lubricant through said charging unit into said nipple, and means within said housing operating said forcing means while said nipple is engaged by said charging unit.

6. A sprocket chain lubricator comprising the combination with a shaft, a sprocket wheel on said shaft, a chain carried about said sprocket wheel, and lubricant-receiving nipples on said chain, of an extension on said shaft, a sleeve mounted about said extension, a clutch handle and means associated with said handle for displacing said sleeve axially relative to the sprocket wheel, a rotatable carrier mounted about said sleeve co-axially with said sprocket wheel, at least one lubricant-charging unit movably supported by said carrier, at least one pin on said carrier and at least one recess in said sprocket wheel engageable by said pin to bring said charging unit into opposition to one of said nipples as it travels around the sprocket wheel, means to move said charging unit into and from engagement with the opposed nipple, means rotating with said carrier for forcing lubricant through said charging unit into said nipple, and means operating said forcing means while said nipple is engaged by said charging unit, said clutch handle and associated means by displacing said sleeve serving to render operative and inoperative when desired said unit moving means and said lubricant forcing means.

7. A sprocket chain lubricator comprising the combination with a shaft, a sprocket wheel on said shaft, a chain carried about said sprocket wheel, and lubricant-receiving nipples on said chain, of an extension on said shaft, a sleeve mounted non-rotatably about said extension, a rotatable carrier mounted about said sleeve co-axially with said sprocket wheel, at least one lubricant-charging unit movably supported by said carrier, means synchonising rotation of said carrier with that of said sprocket wheel to bring said charging unit into opposition to one of said nipples as it travels around the sprocket wheel, means including a lever connected with said charging unit, an annular cam on said sleeve, a follower carried by said lever and engaging said cam to move said charging unit into and from engagement wtih the opposed nipple, means rotating with said carrier for forcing lubricant through said charging unit into said nipple, and means operating said forcing means while said nipple is engaged by said charging unit.

8. A sprocket chain lubricator comprising the combination with a shaft, a sprocket wheel on said shaft, a chain carried about said sprocket wheel, and lubricant-receiving nipples on said chain, of an extension on said shaft, a sleeve mounted non-rotatably about said extension, means for displacing said sleeve axially relative to the sprocket wheel, a rotatable carrier mounted about said sleeve co-axially with said sprocket wheel, at least one lubricant-charging unit movably supported by said carrier, means synchronising rotation of said carrier with that of said sprocket wheel to bring said charging unit into opposition to one of said nipples as it travels around the sprocket wheel, means including a lever articulated to said charging unit, an annular cam mounted on said sleeve, a follower carried by said lever and engaging said cam to move said charging unit into and from engagement with the opposed nipple, a nipple connector mounted for radial displacement in said unit to be aligned with the engaged nipple upon engagement therewith, means rotating with said carrier for forcing lubricant through said charging unit into said nipple, and means operating said forcing means while said nipple is engaged by said charging unit, said sleeve displacing means serving to render operative and inoperative when desired said unit moving means and said lubricant forcing means.

9. A sprocket chain lubricator comprising the combination with a shaft, a sprocket wheel on said shaft, a chain carried about said sprocket wheel, and lubricant-receiving nipples on said chain, of an extension on said shaft, a sleeve mounted non-rotatably about said extension, a rotatable carrier mounted about said sleeve co-axially with said sprocket wheel, at least one lubricant-charging unit movably supported by said carrier, means synchronising rotation of said carrier with that of said sprocket wheel to bring said charging unit into opposition to one of said nipples as it travels around the sprocket wheel, means to move said charging unit into and from engagement with the opposed nipple, an injector ram rotating with said carrier for forcing lubricant through said charging unit into said nipple, and a cam mounted on said sleeve and engaging said ram to operate it while said nipple is engaged by said charging unit.

10. A sprocket chain lubricator comprising the combination with a shaft, a sprocket wheel on said shaft, a chain carried about said sprocket wheel, and lubricant-receiving nipples on said chain, of an extension on said shaft, a sleeve mounted about said extension, a rotatable housing mounted about said sleeve co-axially with said sprocket wheel, at least one lubricant-charging unit movably supported by said housing, means synchronising rotation of said housing with that of said sprocket wheel to locate said charging unit in opposition to one of said nipples as it travels around the sprocket wheel, means including a lever connected with said charging unit, an annular cam mounted on said sleeve, a follower carried by said lever and engaging said cam, to move said charging unit into and from engagement with the opposed nipple, an injector ram in and rotating with said housing for forcing lubricant through said charging unit into said nipple, and a second cam mounted on said sleeve and engaging said ram to operate it while said nipple is engaged by said charging unit.

11. A sprocket chain lubricator comprising the combination with a sprocket wheel, a chain carried about said sprocket wheel, and lubricant-receiving nipples on said chain, of a rotatable carrier mounted co-axially with said sprocket wheel, at least one lubricant-charging unit movably supported by said carrier, means synchronising rotation of said carier with that of said sprocket wheel to locate said charging unit in opposition to one of said nipples as it travels around the sprocket wheel, means supported by and rotating with the carrier and operable by pressure fluid to move said charging unit into and from engagement with the opposed nipple, valve means operable by the rotation of the carrier for controlling said pressure-operable means, means supported by and rotating with said carrier for forcing lubricant through said charging unit into said nipple, and means operating said forcing means while said nipple is engaged by said charging unit.

12. A sprocket chain lubricator comprising the combination with a sprocket wheel, a chain carried about said sprocket wheel, and lubricant-receiving nipples on said chain, of a rotatable carrier mounted co-axially with said sprocket wheel, at least one lubricant-charging unit movably supported by said carrier, means synchronising rotation of said carrier with that of said sprocket wheel to locate said charging unit in opposition to one of said nipples as it travels around the sprocket wheel, means to move said charging unit into and from engagement with the opposed nipple, means supported by and rotating with said carrier for forcing lubricant through said charging unit into said nipple, means operable by pressure fluid to actuate said forcing means while said nipple is engaged by said charging unit, and valve means operable by the rotation of the carrier for controlling said pressure-operable means.

13. A sprocket chain lubricator comprising the combination with a sprocket wheel, a chain carried about said sprocket wheel, and lubricant-receiving nipples on said chain, of a rotatable carrier mounted co-axially with said sprocket wheel, at least one lubricant-charging unit movably supported by said carrier, means synchronising rotation of said carrier with that of said sprocket wheel to locate said charging unit in opposition to one of said nipples as it travels around the sprocket wheel, means supported by and rotating with the carrier and operable by pressure fluid to move said charging unit into and from engagement with the opposed nipple, means supported by and rotating with said carrier for forcing lubricant through said charging unit into said nipple, means operable by pressure fluid to actuate said forcing means while said nipple is engaged by said charging unit, and valve means operable by rotation of the carrier for controlling each of said pressure-operable means.

14. A sprocket chain lubricator comprising the combination with a toothed sprocket wheel, a link chain carried about said sprocket wheel, the number of links in said chain being other than a multiple of the number of teeth in said sprocket wheel, and lubricant-receiving nipples between each pair of said links, of a rotatable carrier mounted co-axially with said sprocket wheel, one lubricant-charging unit movably supported by said carrier, means synchronising rotation of said carrier with that of said sprocket wheel to locate said charging unit in sequence into opposition to each of said nipples as it travels around the sprocket wheel, means supported by and rotating with the carrier and operable by pressure fluid to move said charging unit into and from engagement with the opposed nipple, means rotating with said carrier for forcing lubricant through said charging unit into each of said nipples, means operable by pressure fluid to actuate said forcing means while each of said nipples is engaged by said charging unit, and valve means operable by rotation of the carrier for controlling each of said pressure operable means.

15. A sprocket chain lubricator comprising the combination with a sprocket wheel, a chain carried about said sprocket wheel, and lubricant-receiving nipples on said chain, of a rotatable carrier mounted co-axially with the sprocket wheel, at least one lubricant-charging unit movably supported by said carrier in opposition to and adapted to be engaged with an opposed lubricant receiving nipple, fluid operable movement means rotating with said carrier for moving said charging unit into and from engagement with the opposed nipple, fluid operable lubricant forcing means rotating with said carrier for forcing lubricant through the charging unit into the nipple whilst engaged by said unit, lubricant conduits connecting said forcing means with a source of supply of lubricant under moderate pressure and with said charging unit, a source of pressure fluid for actuating said charging unit movement means and said lubricant forcing means, fluid conduits connecting said movement means and forcing means to said source of pressure fluid and valve means in said fluid conduits controlled by the rotation of said carrier.

16. A sprocket chain lubricator comprising the combination with a sprocket wheel, a chain carried about said sprocket wheel, and lubricant-receiving nipples on said chain, of a rotatable carrier mounted co-axially with said sprocket wheel, at least one lubricant-charging unit movably supported by said carrier, means synchronising rotation of said carrier with that of said sprocket wheel to locate said charging unit in opposition to one of said nipples as it travels around the sprocket wheel, a pneumatic cylinder, an air line to said pneumatic cylinder, a piston rod in said cylinder, mechanical means connecting said piston rod to said charging unit to move said charging unit into and from engagement with the opposed nipple, a pneumatic valve in said air line operable by the rotation of the carrier for controlling said cylinder, means supported by and rotating with said carrier for forcing lubricant through said charging unit into said nipple, and means operating said forcing means while said nipple is engaged by said charging unit.

17. A sprocket chain lubricator comprising the combination with a sprocket wheel, a chain carried about said sprocket wheel, and lubricant-receiving nipples on said chain, of a rotatable carrier mounted co-axially with said sprocket wheel, at least one lubricant-charging unit movably supported by said carrier, means synchronising rotation of said carrier with that of said sprocket wheel to locate said charging unit in opposition to one of said nipples as it travels around the sprocket wheel, a double-acting pneumatic cylinder in axial alignment with said charging unit, an air line to said pneumatic cylinder, a piston rod in said cylinder connected to said charging unit to move said charging unit into and from engagement with the opposed nipple, a pneumatic valve in said air line operable by the rotation of the carrier for controlling said cylinder, means supported by and rotating with said carrier for forcing lubricant through said charging unit into said nipple, and means operating said forcing means while said nipple is engaged by said charging unit.

18. A sprocket chain lubricator comprising the combination with a toothed sprocket wheel, a link chain carried about said sprocket wheel, the number of links in said chain being other than a multiple of the number of teeth in said sprocket wheel, and lubricant-receiving nipples between each pair of said links, of a rotatable carrier mounted co-axially with said sprocket wheel, one lubricant-charging unit movably supported by said carrier, means synchronising rotation of said carrier with that of said sprocket wheel to locate said charging unit in sequence into opposition to each of said nipples as it travels around the sprocket wheel, a first pneumatic cylinder, a first air line to said pneumatic cylinder, a piston rod in said cylinder and connected to said charging unit to move said charging unit into and from engagement with the opposed nipple, a second pneumatic cylinder rotating with said carrier, a second air line to said second pneumatic cylinder, a piston rod in said second cylinder, a lubricant ram, a lubricant pressure conduit from said ram, a check valve in said pressure conduit, the piston rod in said second cylinder being operatively slidable in said ram for forcing lubricant through said check valve and said charging unit while each of said nipples is engaged by said charging unit, said two pneumatic valves being operable by rotation of the carrier each for controlling one of said cylinders.

19. A sprocket chain lubricator comprising the combination with a sprocket wheel, a chain carried about said sprocket wheel, and lubricating-receiving nipples on said chain, of a rotatable carrier mounted co-axially with the sprocket wheel, and lubricant-receiving nipples on said ably supported by said carrier in opposition to and adapted to be engaged with an opposed lubricant-receiving nipple, a first pneumatic cylinder rotating with said carrier for moving said charging unit into and from engagement with the opposed nipple, a second pneumatic cylinder and lubricant forcing means associated therewith rotating with said carrier for forcing lubricant through the charging unit into the nipple whilst engaged by said unit, lubricant conduits connecting said forcing means with a source of supply of lubricant under moderate pressure and with said charging unit, a source of pressure air for actuating said pneumatic cylinders, fluid conduits connecting said cylinders to said source of pressure air, and valve means in said fluid conduits controlled by the rotation of said carrier.

20. A sprocket chain lubricator comprising the combination with a sprocket wheel, a chain carried about said sprocket wheel, and lubricant-receiving nipples on said chain, of a rotatable carrier mounted co-axially with said sprocket wheel, at least one lubricant-charging unit movably supported by said carrier, means synchronizing rotation of said carrier with that of said sprocket wheel to locate said charging unit in opposition to one of said nipples as it travels around the sprocket wheel, a first pneumatic cylinder supported by and rotating with the carrier, a piston rod in said cylinder and connected to said charging unit to move said charging unit into and from engagement with the opposed nipple, a second pneumatic cylinder and an aligned lubricant ram supported by and rotating with said carrier, a common piston rod in said second cylinder and said ram for forcing lubricant through said charging unit while said nipple is engaged by said charging unit, air lines to said cylinders, a pneumatic valve in said air lines operable by rotation of the carrier for jointly controlling said cylinders, a pipe connecting said ram to said charging unit, and a valve in said pipe operable by rotation of the carrier for controlling discharge of lubricant from said ram through said charging unit.

21. A sprocket chain lubricator comprising the combination with a stationary shaft, a sprocket wheel rotatable about said shaft, a chain carried about said sprocket wheel, and lubricant-receiving nipples on said chain, of a rotatable carrier mounted co-axially with said sprocket wheel, at least one lubricant-charging unit movably supported by said carrier, means synchronising rotation of said carrier with that of said sprocket wheel to locate said charging unit in opposition to one of said nipples as it travels around the sprocket wheel, means supported by and rotating with the carrier and operable by pressure fluid to move said charging unit into and from engagement with the opposed nipple, means supported by and rotating with said carrier for forcing lubricant through said charging unit into said nipple, means operable by pressure fluid to actuate said forcing means while said nipple is engaged by said charging unit, and two cams secured to said shaft and two pneumatic valves supported by and rotating with the carrier, fluid connecting means between respective valves and said pressure-operable means, each valve being operable by one of the cams for controlling one of said pressure-operable means.

22. A sprocket chain lubricator comprising the combination with a rotary shaft, a sprocket wheel rotatable on and with said shaft, a chain carried about said sprocket wheel, and lubricant-receiving nipples on said chain, of a rotatable carrier mounted co-axially with said sprocket wheel, at least one lubricant-charging unit movably supported by said carrier, means synchronising rotation of said carrier with that of said sprocket wheel to locate said charging unit in opposition to one of said nipples as it travels around the sprocket wheel, means supported by and rotating with the carrier and operable by pressure fluid to move said charging unit into and from engagement with the opposed nipple, means supported by and rotating with said carrier for forcing lubricant through said charging unit into said nipple, means operable by pressure fluid to actuate said forcing means while said nipple is engaged by said charging unit, a bush on said shaft, two cams secured to said bush, means to hold said bush and said cams stationary, and two pneumatic valves supported by and rotating with the carrier, fluid connecting means between respective valves and said pressure-operable means, each valve being operable by one of the cams for controlling one of said pressure-operable means.

23. A sprocket chain lubricator comprising the combination with a sprocket wheel, a chain carried about said sprocket wheel, and lubricant-receiving nipples on said chain, of a rotatable carrier body having an open outer end mounted co-axially with said sprocket wheel, a carrier cap having a transverse base plate closing the outer end of said body, at least one lubricant-charging unit movably supported by said cap, means synchronising rotation of said carrier body with that of said sprocket wheel to locate said charging unit in opposition to one of said nipples as it travels around the sprocket wheel, a first pneumatic cylinder supported by said base plate within said body, a piston rod in said cylinder, mechanical means connecting said piston rod to said charging unit to move said charging unit into and from engagement with the opposed nipple, a second pneumatic cylinder supported by said base plate within said body, a lubricant ram aligned with said second cylinder, a common piston in said second cylinder and said ram for forcing lubricant through said charging unit while said nipple is engaged by said charging unit, and valve means housed within said body and operable by rotation of the body for controlling said cylinders.

24. A sprocket chain lubricator comprising the combination with a toothed sprocket wheel, a link chain carried about said sprocket wheel, the number of links in said chain being other than a multiple of the number of teeth in said sprocket wheel, and lubricant-receiving nipples between each pair of said links, of a rotatable carrier body having an open outer end mounted co-axially with said sprocket wheel, a carrier cap having a transverse base plate closing the outer end of said body, one lubricant-charging unit movably supported by said carrier cap, means synchronising rotation of said carrier body with that of said sprocket wheel to locate said charging unit in sequence in opposition to each of said nipples as it travels around the sprocket wheel, a first pneumatic cylinder supported by said base plate within said body, a piston rod in said cylinder, rack and pinion means in said cap connecting said piston rod to said charging unit, to move said charging unit into and from engagement with the opposed nipple, a second pneumatic cylinder supported by said base plate within said body, a lubricant ram aligned with said second cylinder, a common piston in said second cylinder and said ram for forcing lubricant through said charging unit while each of said nipples is engaged by said charging unit, two non-rotary cams mounted within said body, two pneumatic fluid supply lines each supplying one of said cylinders and two pneumatic valves supported within the carrier body each in one of said supply lines and operable by one of the cams for controlling one of said cylinders.

25. A sprocket chain lubricator comprising the combination with a shaft, at least three toothed sprocket wheels on said shaft, link chains carried one about each sprocket wheel, and lubricant-receiving nipples on each chain, of a rotatable carrier mounted co-axially with each sprocket wheel, at least one lubricant-charging unit movably supported by each of said carriers, means synchronising rotation of said carriers with that of said sprocket wheels to locate said charging units in opposition to each of said nipples of the associated chain as it travels around the sprocket wheel, means supported by and rotating with each carrier and operable by pressure fluid to move its charging unit into and from engagement with the opposed nipple, means rotating with each carrier for forcing lubricant through said charging unit into each of said nipples, means in each carrier operable by pressure fluid to actuate said forcing means while each of said opposed nipples is engaged by the associated charging unit, and valve means operable by rotation of certain of the carriers for controlling the corresponding pressure operable means.

26. A sprocket chain lubricator comprising the combination with a shaft, at least three toothed sprocket wheels on said shaft, link chains carried one about each sprocket wheel, the number of links in each chain being the same and other than a multiple of the number of teeth in said sprocket wheel, and lubricant-receiving nipples between each pair of said links, of a rotatable carrier mounted co-axially with each sprocket wheel, one lubricant-charging unit movably supported by each of said carriers, meaning synchronising rotation of said carriers with that of said sprocket wheels to locate said charging units in sequence into opposition to each of the nipples in the associated chain as it travels around the sprocket wheel, means supported by and rotating with each carrier and operable by pressure fluid to move its charging unit into and from engagement with the opposed nipple, means rotating with said carrier for forcing lubricant through said charging unit into each of said nipples, means operable by pressure fluid to actuate said forcing means while each of said nipples is engaged by said charging unit, and pneumatic valve means in each outer carrier operable by rotation of the carrier for controlling said pressure operable means in the same carrier, and pipes connecting the pressure operable means in an intermediate carrier to the valve means in one of said outer carriers whereby said means in the intermediate carrier are also operable.

References Cited in the file of this patent

UNITED STATES PATENTS

| 1,677,649 | Morgan | July 17, 1928 |

FOREIGN PATENTS

| 238,580 | Great Britain | Aug. 5, 1926 |
| 238,906 | Great Britain | Sept. 30, 1926 |